US012777000B2

(12) United States Patent
Wang et al.

(10) Patent No.: US 12,777,000 B2
(45) Date of Patent: Oct. 27, 2026

(54) SYNCHRONIZATION OF ACCESS TO A DISTRIBUTED NETWORK RESOURCE FROM MULTIPLE HOSTS

(71) Applicant: Sensormatic Electronics, LLC, Boca Raton, FL (US)

(72) Inventors: Zhiqian Wang, Lisle, IL (US); Mikhail Polyakov, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 294 days.

(21) Appl. No.: 18/403,412

(22) Filed: Jan. 3, 2024

(65) Prior Publication Data

US 2024/0236015 A1 Jul. 11, 2024

Related U.S. Application Data

(60) Provisional application No. 63/479,129, filed on Jan. 9, 2023.

(51) Int. Cl.

*H04L 47/70* (2022.01)
*H04L 12/18* (2006.01)
*H04L 67/10* (2022.01)
*H04L 69/16* (2022.01)

(52) U.S. Cl.

CPC .............. *H04L 47/82* (2013.01); *H04L 12/18* (2013.01); *H04L 67/10* (2013.01); *H04L 69/16* (2013.01)

(58) Field of Classification Search

CPC ......... H04L 47/82; H04L 12/18; H04L 67/10; H04L 69/16; H04L 29/06; H04L 65/611; H04L 12/185; H04L 12/1877; H04L 43/0852; H04L 43/50; H04L 61/1511; H04L 61/2069; H04L 61/4511; H04L 61/5069; H04L 65/80; H04N 21/4384; H04N 21/6405; H04N 21/64322

See application file for complete search history.

(56) References Cited

U.S. PATENT DOCUMENTS

2003/0097425 A1 5/2003 Chen
2019/0140884 A1* 5/2019 Liu ..................... H04L 61/5069
2020/0220742 A1* 7/2020 Zhang ................. H04L 43/0811
2022/0014921 A1* 1/2022 Da Silva ............... H04L 9/3242
2023/0319514 A1* 10/2023 Kim ......................... H04W 4/08 370/312
2024/0422022 A1* 12/2024 Ling ..................... H04W 76/19
2024/0430981 A1* 12/2024 Wu ....................... H04W 72/00

* cited by examiner

*Primary Examiner* — Rushil P. Sampat
(74) *Attorney, Agent, or Firm* — ArentFox Schiff LLP

(57) ABSTRACT

Example implementations include methods, apparatuses and computer-readable media for controlling access to a shared resource on a distributed network that include transmitting a multicast request packet to a plurality of hosts to request access to the shared resource, setting a first timer for a first predetermined period of time after transmitting the multicast request packet, verifying that the shared resource is accessible in response to determining that, during the first predetermined period of time, no multicast packets related to access to the shared resource have been received, and performing one or more operations on the shared resource in response to verifying that the shared resource is accessible.

20 Claims, 7 Drawing Sheets

SYNCHRONIZATION OF ACCESS TO A DISTRIBUTED NETWORK RESOURCE FROM MULTIPLE HOSTS

CROSS-REFERENCE TO RELATED APPLICATION(S)

The present application claims the benefit of U.S. Provisional Application No. 63/479,129, entitled "SYNCHRONIZATION OF ACCESS TO A DISTRIBUTED NETWORK RESOURCE FROM MULTIPLE HOSTS" and filed on Jan. 9, 2023, which is assigned to the assignee hereof and incorporated by reference herein in the entirety.

FIELD

The described aspects relate to management of resources by multiple networked computing devices. More particularly, the described aspects relate to synchronization of access to a distributed network resource from multiple hosts.

BACKGROUND

In various forms of networked or otherwise distributed data processing systems, complex and/or multiple related processes are often routed to shared computing resources for distribution, dissemination, or execution. For example, in many applications, network-based computer resources such as data, files, and/or hardware devices and/or functionality could be distributed over a set of hosts (e.g., computing devices) over the network and could be accessed at any time by only one host on the network.

Access is the ability to do something with a computer resource (e.g., use, change, or view). Access control is the means by which the ability is explicitly enabled or restricted in some way (usually through physical and system-based controls). Computer-based access controls are called logical access controls. Logical access controls can prescribe not only who or what (e.g., in the case of a process) is to have access to a specific system resource, but also the type of access that is permitted.

Some systems may not include a central resource manager providing a centralized access control for all the hosts on the network. Such systems would benefit from improved protocols by which all the hosts in a network can coordinate their access to a shared resource.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for controlling access to a shared resource on a distributed network. The method includes transmitting a first multicast request packet to a plurality of hosts to request access to the shared resource. The method further includes setting a first timer for a first predetermined period of time after transmitting the first multicast request packet. Additionally, the method further includes verifying that the shared resource is accessible, in response to determining that, during the first predetermined period of time, no multicast packets related to access to the shared resource have been received. Additionally, the method further includes performing one or more operations on the shared resource, in response to verifying that the shared resource is accessible.

Another example aspect includes an apparatus for controlling access to a shared resource on a distributed network, comprising one or more memories storing instructions and one or more processors communicatively coupled with the one or more memories. The one or more processors, individually or in combination, are configured to execute the instructions to transmit a first multicast request packet to a plurality of hosts to request access to the shared resource. The one or more processors, individually or in combination, are further configured to execute the instructions to set a first timer for a first predetermined period of time after transmitting the first multicast request packet. Additionally, the one or more processors, individually or in combination, are further configured to execute the instructions to verify that the shared resource is accessible, in response to determining that, during the first predetermined period of time, no multicast packets related to access to the shared resource have been received. Additionally, the one or more processors, individually or in combination, are further configured to execute the instructions to perform one or more operations on the shared resource, in response to verifying that the shared resource is accessible.

Another example aspect includes an apparatus for controlling access to a shared resource on a distributed network, comprising means for transmitting a first multicast request packet to a plurality of hosts to request access to the shared resource. The apparatus further includes means for setting a first timer for a first predetermined period of time after transmitting the first multicast request packet. Additionally, the apparatus further includes means for verifying that the shared resource is accessible, in response to determining that, during the first predetermined period of time, no multicast packets related to access to the shared resource have been received. Additionally, the apparatus further includes means for performing one or more operations on the shared resource, in response to verifying that the shared resource is accessible.

Another example aspect includes one or more computer-readable media having instructions stored thereon for controlling access to a shared resource on a distributed network, wherein the instructions are executable by one or more processors, individually or in combination, to transmit a first multicast request packet to a plurality of hosts to request access to the shared resource. The instructions are further executable to set a first timer for a first predetermined period of time after transmitting the first multicast request packet. Additionally, the instructions are further executable to verify that the shared resource is accessible, in response to determining that, during the first predetermined period of time, no multicast packets related to access to the shared resource have been received. Additionally, the instructions are further executable to perform one or more operations on the shared resource, in response to verifying that the shared resource is accessible.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which.

DETAILED DESCRIPTION

Various aspects are now described with reference to the appended drawings. In the following description, for purposes of explanation, numerous specific details are set forth in order to provide a thorough understanding of one or more aspects. It may be evident, however, that such aspect(s) may be practiced without these specific details.

The disclosed method and system is directed to synchronizing access from multiple hosts to resources distributed over a local network. A host may include or be associated with a plurality of resources, and each resource may include data, a process or function, or an entire hardware device (e.g., a Radio Frequency IDentification (RFID) reader, a printer, etc.). Moreover, a resource may be owned or managed by the corresponding host device, but the resource may be accessible to one or more other host devices in a distributed network. For instance, in an example of the resource being data, such as a password, a first host device may be configured as an owner of the password, meaning that other network devices in the distributed network may access, obtain a copy of, or perform an operation on (e.g., change a value of) the password via communication over the distributed network with the first host device. In any case, the disclosed method and system controls access to shared resources in a distributed network based on utilization of multicast data packets for access request and access denial. In particular, to ensure a network-based resource can be accessed, a host device is configured to transmit a multicast data packet to other host devices in the distributed network, where the multicast data packet indicates interest in accessing the resource. The host device then waits for a response from the other host devices, and depending on whether a response is received or not received, and/or on what type of response is received, the method and system of the present aspects coordinates access to the resource among the multiple hosts. The present aspects provide a decentralized method and system for managing shared network resources, avoid conflicts in resource usage, avoid race conditions in requesting resource usage, and/or otherwise manage conflicts between hosts for access to a shared resource on a distributed network.

Also, as used herein, a "packet" generally refers to a formatted unit of data carried by a packet-switched network. A packet typically can include user data along with control data. The control data can provide information for delivering the user data. For example, the control data can include source and destination network addresses/ports, error checking codes, sequencing information, hop counts, priority information, security information, or other suitable information regarding the user data. Typically, the control data can be contained in headers and/or trailers of a packet. The headers and trailers can include one or more data field containing suitable information.

Figure 1:
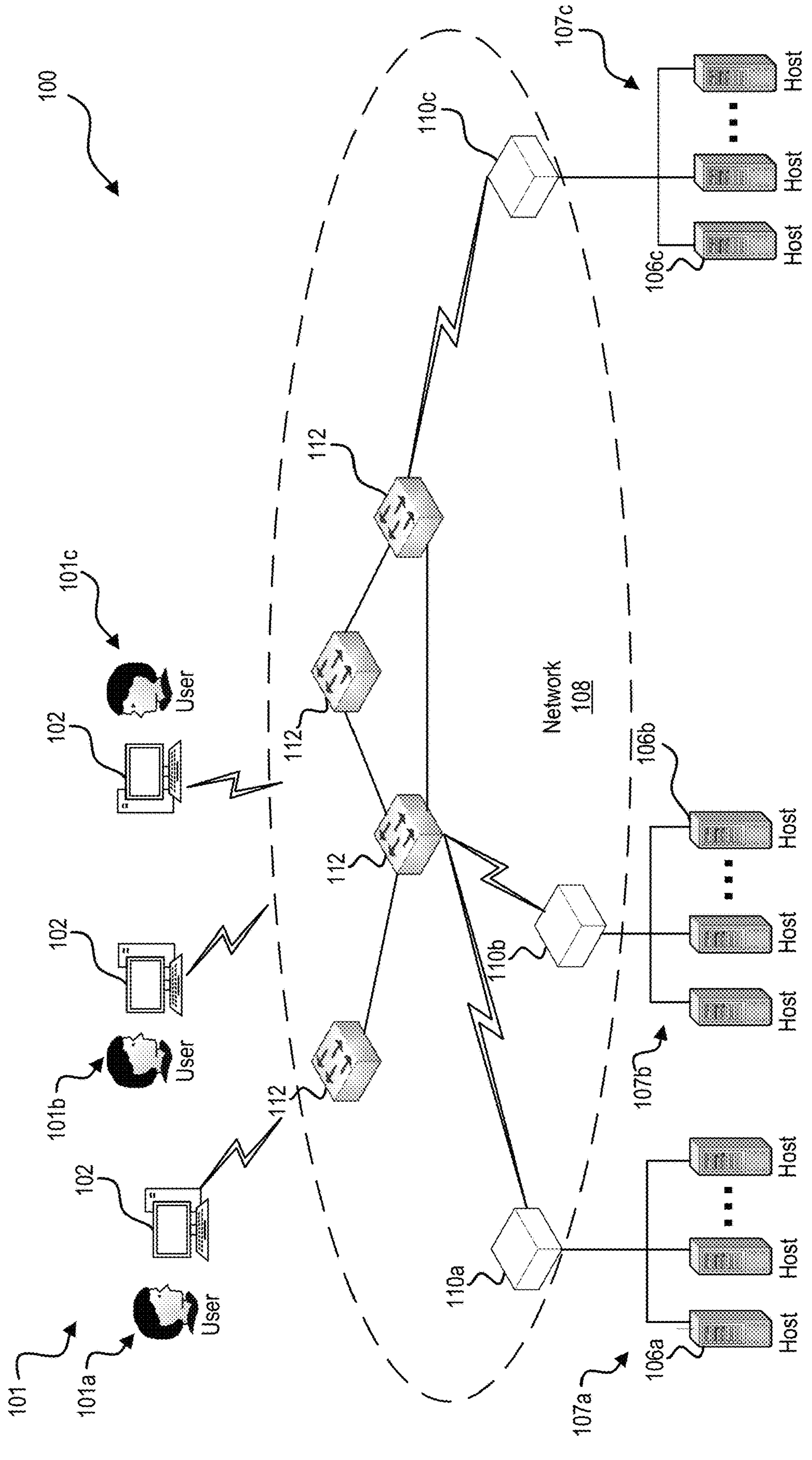
FIG. 1 is a schematic diagram illustrating an example distributed computing system implementing access to a distributed network resource from multiple hosts, in accordance with aspects of the present disclosure.

FIG. 1 is a schematic diagram illustrating an example of a distributed computing system 100 implementing access to one or more distributed network resources 110 among multiple hosts 106, in accordance with aspects of the present disclosure. As shown in FIG. 1, the distributed computing system 100 can include a communication network 108 interconnecting a plurality of hosts 106 and a plurality of client devices 102 associated with corresponding users 101*a*-101*c* operatively coupled to one another. Even though particular components of the distributed computing system 100 are shown in FIG. 1, in other aspects, the distributed computing system 100 may also include additional and/or different components or arrangements. For example, in certain aspects, the distributed computing system 100 can also include network storage devices, additional hosts, and/or other suitable components (not shown) in other suitable configurations.

As shown in FIG. 1, the communication network 108 may include one or more network resources 110 that may be shared by the multiple hosts 106. In certain aspects, the hosts 106 may be organized into racks, action zones, groups, sets, by physical or geographical location, or by other suitable divisions. For example, in the illustrated aspect, the hosts 106, e.g., hosts 106*a*-106*c*, may be grouped into three host sets identified individually as first, second, and third host sets 107*a*-107*c*. Each of the host sets 107*a*-107*c* may be operatively coupled to at least one corresponding shared network resource 110, such as shared network resources 110*a*-110*c*. The shared resources 110*a*-110*c* may be operatively coupled to one or more network nodes 112 to form a computer network in a hierarchical, flat, mesh, or other suitable types of topology. The communication network 108 can allow communication among hosts 106 and the shared resources 110. In other aspects, the multiple host sets 107*a*-107*c* may share a single network resource 110 or can have other suitable arrangements.

The hosts 106 may individually be configured to provide computing, storage, and/or other suitable cloud or other suitable types of computing services. For example, as described in more detail below with reference to FIG. 2, one of the hosts 106 may be a computing device configured to communicate with a shared network resource (e.g., a password management server). In addition, each of the hosts may be configured to perform computation, communications, and/or other suitable tasks.

Figure 2:
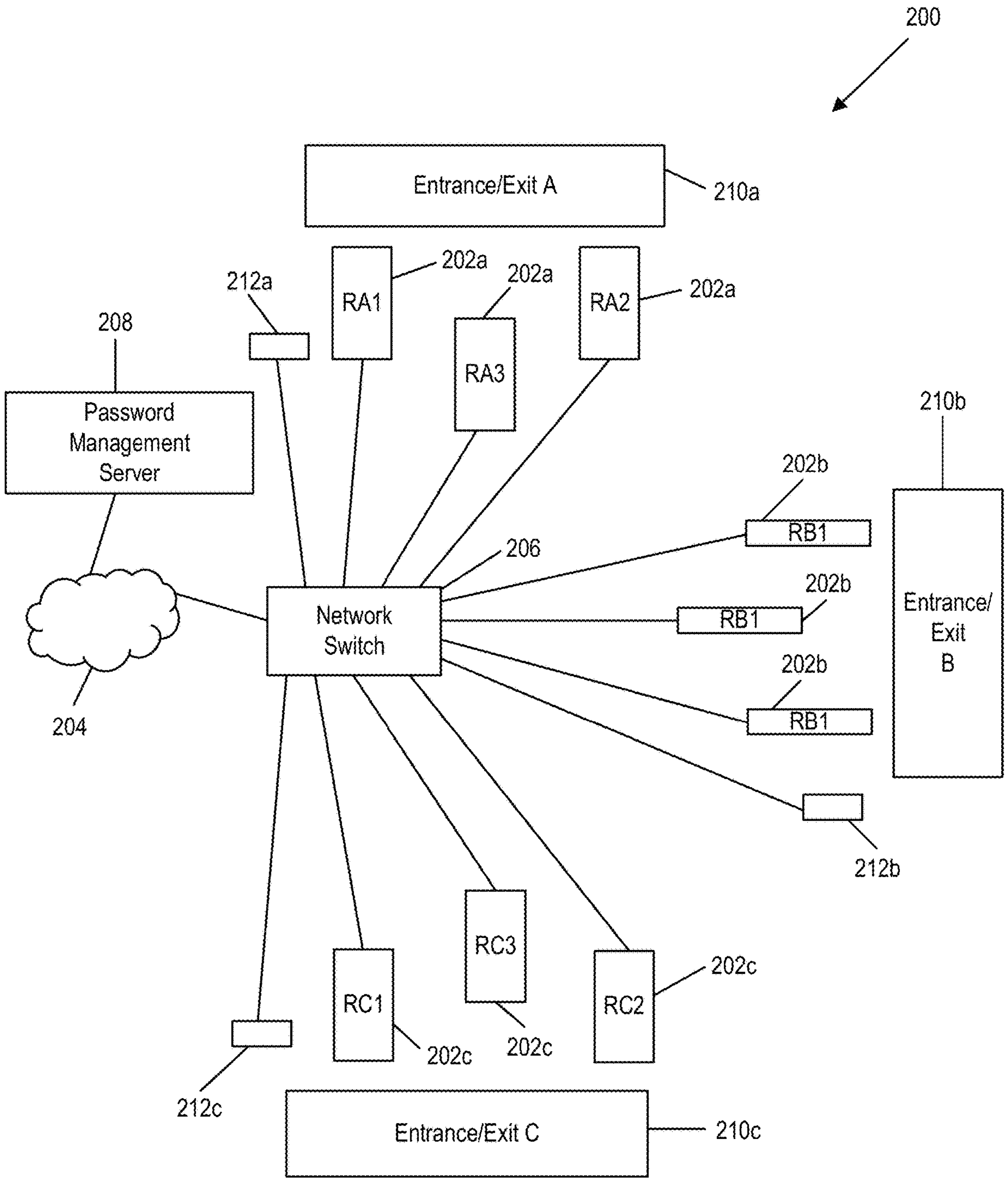
FIG. 2 is an example system implementing one or more aspects of the present disclosure in a retail establishment environment.

FIG. 2 shows an example system 200 implementing one or more aspects of the present disclosure in a retail establishment environment. The system 200 may comprise a theft protection system, and may include a shared network resource in the form of a password management server 208 that manages passwords used to access one or more RFID readers 202 or similar devices, associated with one or more computing devices 212, and communicatively coupled to one or more networks 204 (e.g., the Internet) via one or more network switches 206. In this case, the password management server 208 and the one or more computing devices 212 are respective host devices, and the computing devices 212 communicate with the password management server 208, for example, to obtain and/or update passwords for the RFID readers 202. Thus, the techniques of the present aspects may be utilized as described herein to control and/or synchronize access to and/or updating of the passwords.

The network 204 may include, but is not limited to, a retail store wireless fidelity (Wi-Fi) network, the Internet, a mobile telecom network, and/or a manufacturer/wholesale network. It is noted that several optional elements are depicted for comprehensive purposes. It should be understood that other implementations beyond the particular recited examples are possible and would be apparent to one of ordinary skill in the art upon review of the present disclosure. The components of system 200 can be combined or discrete in their physical design, as appropriate, with some components being co-located if appropriate (e.g., in a same computing hardware box) or separated apart. Also, appropriate software and computer readable instructions and code are typically programmed onto memory devices in the components carrying out processing instructions using processing circuitry. Similarly, the type of network 204 used for communication among the devices can vary as needed for a particular implementation.

In an aspect, the RFID readers 202 may communicate with each other using a User Datagram Protocol (UDP). In contrast to a Transmission Control Protocol (TCP), UDP is a message-based connectionless protocol that does not require hand-shaking dialogues for guaranteeing reliability, ordering, or data integrity. With UDP, applications can send messages, in this case referred to as datagrams, to other hosts on an Internet protocol (IP) network without requiring prior communications to set up special transmission channels or data paths.

RFID is a data collection technology that uses radio-sensitive tags for storing data. RFID tags, which are also sometimes referred to as transponders, typically comprise two parts. The first part is an integrated circuit for storing and processing data, modulating and demodulating RF signals, and performing other specialized functions. The second part is an antenna that provides the mechanism for the integrated circuit to transmit its stored data to an RFID reading device. An RFID reading device is also called an interrogator. In most applications, RFID tags are affixed to moveable inventory and act in a passive way, being interrogated by stationary RFID readers 202.

In an aspect, the example of a retail establishment illustrated in FIG. 2 may have three separate entrances/exits 210, e.g., Entrance/Exit A, Entrance/Exit B, and Entrance/Exit C. Exit RFID readers 202, e.g., 202*a*-202*c* associated with corresponding entrance/exit 210*a*-210*c*, act as theft protection "walls" or electronic boundaries in retail stores. For instance, the RFID readers 202 include antennas and circuitry that only read RFID labels in a well-defined range and direction and not from the whole retail store environment. In other words, the RFID labels activate a response to the RFID readers 202 when the RFID labels (which are affixed to goods) are proximal to or within the pre-determined range. In some aspects, the range is a relatively short range, such as 5 meters or less, while in other aspects the range may be 1 meter or less.

In an aspect, the retail establishment illustrated in FIG. 2 may further include one or more computing devices 212, such as, but not limited to network computers. For instance, computing devices 212*a*-212*c* may be associated with a corresponding one of the entrances/exits 210*a*-210*c* and the corresponding shared network resources, e.g., RFID devices 202*a*-202*c*. Further, for example, each computing device 212 may be configured to communicate with a password management server 208, which controls access to the password for each RFID reader 202. Each computing device 212 may contact the password management server 208 to retrieve the latest password. In an aspect, each computing device 212 may be configured to update passwords of individual RFID readers 202. In an aspect, each computing device 212 may keep its own copy of all passwords for all RFID readers 202 on the local network.

In an aspect, each computing device 212 may serve as a logical gate, or may control a physical gate, associated with a particular entrance/exit to/from a retail establishment. For example, a first computing device 212*a* may be associated with a first entrance/exit 210*a*, a second computing device 212*b* may be associated with a second entrance/exit 210*b*, and a third computing device 212*c* may be associated with a third entrance/exit 210*c*. Furthermore, the first computing device 212*a* may be communicatively coupled to a first group of RFID readers 202*a*, the second computing device 212*b* may be communicatively coupled to a second group of RFID readers 202*b*, and the third computing device 212*c* may be communicatively coupled to a third group of RFID readers 202*c*.

In an aspect, each computing device 212*a*-212*c* may include, or may be communicatively coupled to, other sensors. For example, the computing devices 212*a*-212*c* may include a plurality of count sensors. Each of these count sensors may be utilized to maintain records of the people entering or exiting the designated area. More specifically, the count sensors may be utilized to count the people entering or passing through entrances/exits 210*a*-210*c* and record information related to this flow of individuals. Such sensor information may be useful to the management of such establishments to measure and forecast the flow of traffic into and out of the establishment. Furthermore, this information may be used to assess the results of certain marketing efforts or special events.

Furthermore, in an aspect, the system 200 illustrated in FIG. 2 may be used as an inventory and/or anti-theft system. For example, as each item is presented as inventory in the system 200, it can be tagged or labeled with RFID technology that contains a unique RFID item number and is then associated with a stock-keeping unit (SKU) in a master database. If the item is selected for purchase by a customer, it may be scanned at a point of sale using one of the RFID readers 202*a*-202*c*, and the RFID tag or label may be deactivated and can be used again for another item of merchandise. However, if the activated RFID tag passes by one of the RFID readers 202*a*-202*c*, a corresponding alarm may be activated indicating a potential theft situation.

The network switch 206 may facilitate interconnections and communications among network clients (such as RFID readers 202, computing devices 212, password management server 208, and the like). Conventional networks may utilize twisted pair cable such as Category 5, for example. Using multicasting, the network switch 206 may distribute multicast packets to a set of interested receivers that can be on different subnetworks and that are configured as members of a multicast group. Protocol Independent Multicast (PIM) is one example of a protocol for creating multicast distribution trees in the network for distributing packets. Redundant multicast sources for multicast content can be configured with a common anycast IP address and each output a separate identical multicast stream.

In an aspect, the password management server 208 may include a cloud-based computing device having active password manager functionality. The password management server 208 may be configured to manage and periodically update passwords for the RFID readers 202. In an aspect, each record in a centralized database maintained by the password management server 208, in addition to the encrypted password information, may also contain password status and timestamp information. In an aspect, password status may include, but is not limited to, "current password," "default password," "unknown," and "updating." "Current password" status indicates an active password that is currently configured on a particular RFID reader 202. "Default password" indicates an initial pre-configured password. "Updating" status indicates that a corresponding password is in the process of being changed, and access to a shared resource is not available. In an aspect, at least some RFID readers 202 may be reused. For example, if a new RFID reader 202 is connected to the network 204, and the new RFID reader 202 has been used in a different retail establishment before and the password of such RFID reader 202 has been changed and not reset to a default password, then the password of such RFID reader 202 is unknown.

A user can create a set of rules on the password management server 208 to automatically change passwords for each of the RFID readers 202 using corresponding computing devices 212*a*-212*c*. For example, the set of rules may include a pre-determined time frequency setting indicating an interval or period at which the passwords of the RFID readers 202 should be automatically updated. The pre-determined time frequency can be any interval of time, such as hours, days, or months. The password management server 208 thus may allow the users to facilitate the automatic creation and replacement of the old passwords based on a one-time instruction, which is provided while setting up the RFID readers 202 with the password management server 208, thereby preventing other parties from manually changing the passwords or intercepting the automatically updated passwords.

In one aspect, each computing device 212*a*-212*c* may only initiate a change password transaction for one of the RFID readers 202 it is communicatively coupled with. In other words, the first computing device 212*a* may be configured to manage passwords for the first group of RFID readers 202*a*, the second computing device 212*b* may be configured to manage passwords for the second group of RFID readers 202*b*, and the third computing device 212*c* may be configured to manage passwords for the third group of RFID readers 202*c*.

In this case, the password management server 208 comprises a resource shared by the plurality of RFID readers 202. In an aspect, the password management server 208 may be configured to perform password synchronization. The need for password synchronization may arise in a distributed computing scenario in which computing resources are spread out across two or more computing devices, where each computing device maintains its own device ID/password table.

In one implementation, for example, system 200 operates to control and/or synchronize passwords used by the RFID readers 202. For instance, the password synchronization may be "full" ("replicated") password synchronization. Full password synchronization means that if a computing device, for example a first computing device 212*a*, changes a password for a particular RFID reader, for example RFID reader 202*a*, then that change will affect the password tables in all other computing devices that share this resource. When full password synchronization is employed, after the password management server 208 receives notice that a password has changed by one computing device (e.g., first computing device 212*a*), that change is then communicated to other computing devices (e.g., second computing device 212*b* and third computing device 212*c*).

Figure 3:
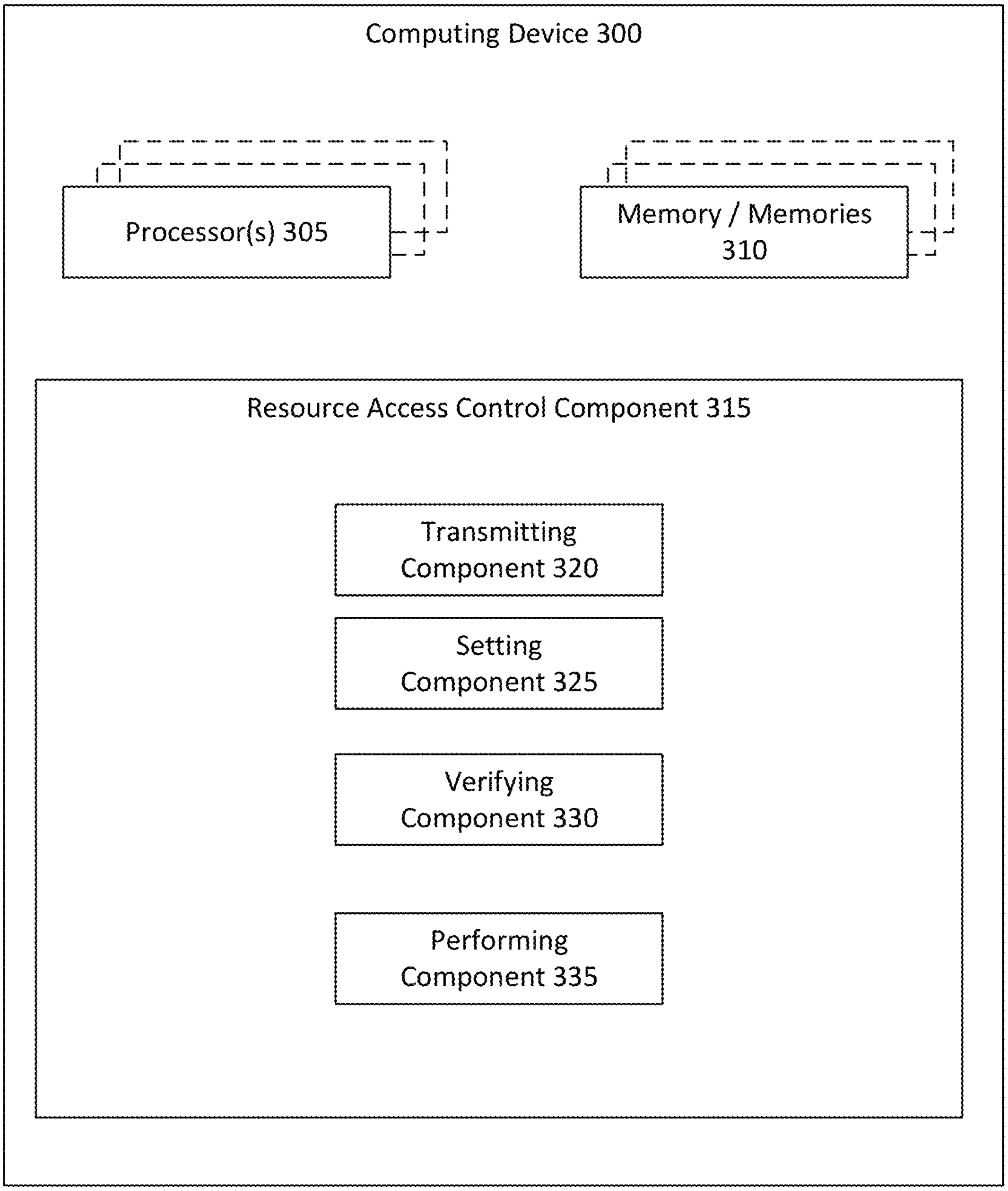
FIG. 3 is a block diagram of an example computing device having components configured to perform a method for controlling access to a resource among multiple hosts on a distributed network, in accordance with aspects of the present disclosure.

FIG. 3 is a block diagram of an example of a computing device 300 having components configured to perform a method for controlling access to a resource among hosts on a distributed network. In one aspect, computing device 300 may represent any of the computing devices 212*a*-212*c* shown in FIG. 2 and may include one or more processors 305 (e.g., one or more central processing units (CPUs)), one or more memories 310, and one or more components 315, 320, 325, 330, and 335 configured to perform a method for controlling access to a resource shared among hosts on a distributed network.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may in combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

When acting under the control of appropriate software or firmware, the one or more processors 305, individually or in combination, may be responsible for implementing specific functions. In at least one aspect, the one or more processors 305, individually or in combination, may be caused to perform one or more of the different operations under the control of software modules/components 315, 320, 325, 330, and/or 335, which, for example, may include an operating system and any appropriate applications software, drivers, and the like.

In some aspects, the one or more processors 305 may include specially designed hardware (e.g., application-specific integrated circuits (ASICs), electrically erasable programmable read-only memories (EEPROMs), field-programmable gate arrays (FPGAs), and the like) for controlling the operations of computing device 300. In a specific aspect, the one or more memories 310 (such as non-volatile random access memory (RAM) and/or read-only memory (ROM)) also form part of the one or more processors 305. However, there are many different ways in which memory may be coupled to the system. The one or more memories 310 may be used for a variety of purposes, such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In an aspect, the computing device 300 may include a resource access control component 315 that includes one or more of the following components: transmitting component 320, setting component 325, verifying component 330, and performing component 335. Functionality of these components is described below in conjunction with FIGS. 4-7.

Although the system shown in FIG. 3 illustrates one specific architecture for a computing device 300 for implementing the techniques of the invention described herein, it is by no means the only device architecture on which at least a portion of the features and techniques described herein may be implemented. For example, architectures having one or any number of processors can be used, and such processors can be present in a single device or distributed among any number of devices.

Regardless of computing device configuration, the system of the present disclosure may employ one or more memories or memory modules (such as, for example, the one or more memories 310) configured to store data, program instructions for the general-purpose network operations, and/or other information relating to the functionality of controlling access to a resource distributed among hosts on a distributed network described herein. The program instructions may control the operation of an operating system and/or one or more applications, for example. The memory or memories may also be configured to store data structures, password information, device identifier information, timestamp information, and/or other specific non-program information described herein.

Because such information and program instructions may be employed to implement the systems/methods described herein, at least some computing device aspects may include non-transitory computer-readable or machine-readable storage media, which, for example, may be configured or designed to store program instructions, state information, and the like for performing various operations described herein. Examples of such non-transitory computer-readable storage media include, but are not limited to, magnetic media such as hard disks, floppy disks, and magnetic tape; optical media such as compact disk (CD) ROM (CD-ROM) disks; magneto-optical media such as floptical disks, and hardware devices that are specially configured to store and perform program instructions, such as RAM, ROM, flash memory, memristor memory, and the like. Examples of program instructions include both machine code, such as produced by a compiler, and files containing higher level code that may be executed by the computer using an interpreter.

Figure 4:
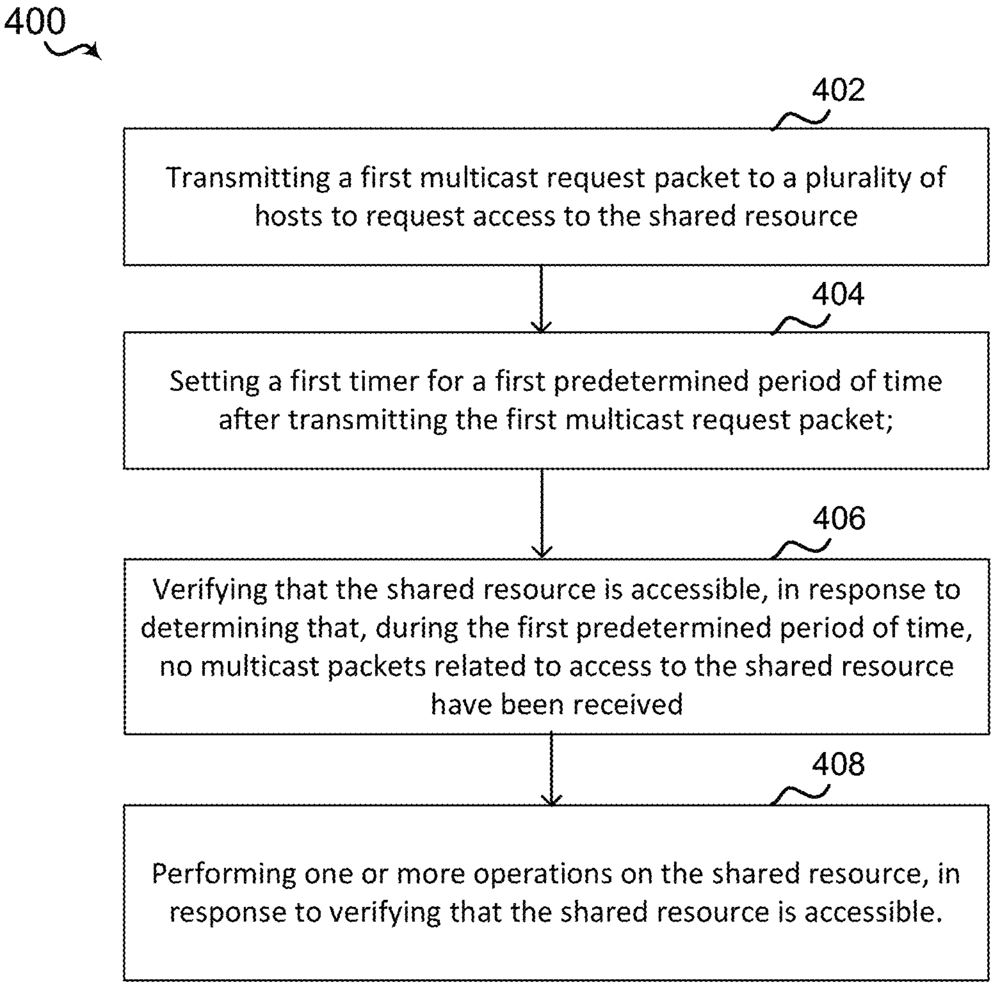
FIG. 4 is a flowchart of an example method for controlling access to a resource among multiple hosts on a distributed network, in accordance with aspects of the present disclosure.

Referring to FIG. 4, in operation, computing device 300 may perform a method 400 of controlling access to a shared resource on a distributed network, such as via execution of at least one of the components 315-335 by the one or more processors 305, individually or in combination, and/or the one or more memories 310, individually or in combination. Method 400 may be performed by computing device 300 in a non-intrusive manner with respect to the shared resource, e.g., the shared resource may not be aware of the operation of method 400. In one implementation, this method is based on multicast data packet exchanges for access request and access denial. For instance, an example protocol that may be utilized in the present disclosure is UDP. UDP multicast protocol does not utilize a handshake method of establishing a connection. UDP is a connectionless transport-layer protocol that belongs to the IP family. UDP is basically an interface between IP and upper layer processes. UDP protocol ports distinguish multiple applications running on a single device from one another.

At block 402, the method 400 includes transmitting a first multicast request packet to a plurality of hosts to request access to the shared resource. For example, in an aspect, computing device 300, one or more processors 305 individually or in combination, one or more memories 310 individually or combination, resource access control component 315, and/or transmitting component 320 may be configured to or may comprise means for transmitting a first multicast request packet to a plurality of hosts to request access to the shared resource.

For example, in the example illustrated in FIG. 2, the first computing device 212*a* may transmit a multicast request packet to computing devices 212*b* and 212*c*. The multicast request packet transmitted at block 402 may include enough information to request an access to a shared resource, such as, but not limited to, one or more of a message identifier, a shared resource identifier, or access request information. In this case, the message identifier may uniquely identify a particular type of message. The message identifier may include elements identifying an intent, a type, and/or the like. The intent may correspond to the service objective (e.g., password synchronization). The type may correspond to the type of the message. For example, the type may correspond to a request, a response, and/or the like. If the type corresponds to a request, then the type may indicate that a response message is expected. If the type corresponds to a response (e.g., multicast denial packet), then the type may indicate that the message is a response to a prior request message (e.g., multicast request packet). The shared resource identifier may indicate a desired resource (e.g., a device ID/password table). The access request information may indicate a type of a request (e.g., a read request or a write request).

Further, in accordance with the disclosed aspects, to avoid simultaneous access to the shared resource, the computing device 300 waits for a specified period of time to make sure that no other request to access the same shared resource is received, as described below.

In an aspect, at block 404, the method 400 further includes setting a first timer for a first predetermined period of time after transmitting the first multicast request packet. For example, in an aspect, computing device 300, one or more processors 305 individually or in combination, one or more memories 310 individually or combination, resource access control component 315, and/or setting component 325 may be configured to or may comprise means for setting a first timer for a first predetermined period of time after transmitting the first multicast request packet.

For example, in an aspect, setting component 325 may be configured to or may comprise means, such as, but not limited to a timer circuit, for setting a first timer for a first predetermined period of time after transmitting the multicast request packet. If the timer is still running when another multicast request packet is received by the computing device 300 and the received request packet requests access to the same shared resource, the computing device 300 may determine that there is a race condition. If the first timer times out without receipt of another multicast request packet, the computing device 300 may conclude that no other host is attempting to access the same shared resource and may continue an attempt to gain access to the shared resource as described below.

At block 406, the method 400 includes verifying that the shared resource is accessible, in response to determining that, during the first predetermined period of time, no multicast packets related to access to the shared resource have been received. For example, in an aspect, computing device 300, one or more processors 305 individually or in combination, one or more memories 310 individually or combination, resource access control component 315, and/or verifying component 330 may be configured to or may comprise means for verifying that the shared resource is accessible, in response to determining that, during the first predetermined period of time, no multicast packets related to access to the shared resource have been received.

For example, in an aspect, the verifying component 330 may be configured to or may comprise means for verifying that the shared resource is accessible, in response to receiving no multicast request-related packets during the first predetermined period of time.

An example implementation of the verifying actions performed by the verifying component 330 are described below in conjunction with FIG. 7.

At block 408, the method 400 includes performing one or more operations on the shared resource, in response to verifying that the shared resource is accessible. For example, in an aspect, computing device 300, one or more processors 305 individually or in combination, one or more memories 310 individually or combination, resource access control component 315, and/or performing component 335 may be configured to or may comprise means for performing one or more operations on the shared resource, in response to verifying that the shared resource is accessible.

For example, the performing at block 408 may include synchronizing (updating) a centralized copy of a corresponding password maintained by the password management server 208.

Figure 5:
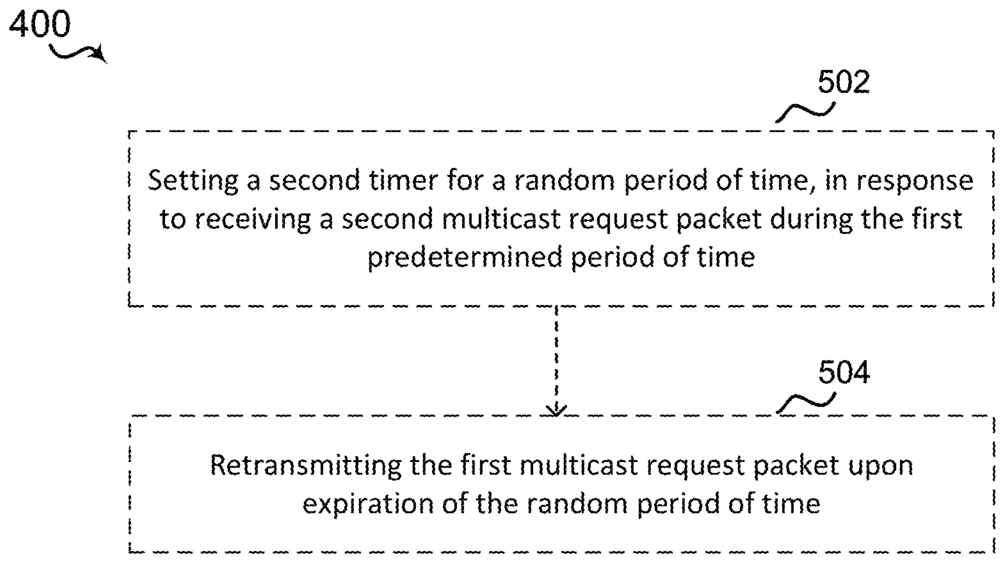
FIG. 5 is a flowchart of additional aspects of the method of FIG. 4 for retransmitting a multicast request packet in response to receiving another multicast request packet, in accordance with aspects of the present disclosure.

Referring to FIG. 5, in an alternative or additional aspect, at block 502, the method 400 may further include setting a second timer for a random period of time, in response to receiving a second multicast request packet during the first predetermined period of time. For example, in an aspect, computing device 300, one or more processors 305 individually or in combination, one or more memories 310 individually or combination, resource access control component 315, and/or setting component 325 may be configured to or may comprise means for setting a second timer for a random period of time, in response to receiving a second multicast request packet during the first predetermined period of time.

For example, in an aspect, the setting component 325 may be configured to or may comprise means, such as, but not limited to a timer circuit, for setting a second timer for a random period of time, in response to receiving a multicast request packet during the first predetermined period of time.

For example, the setting component 325 may variably (at random) set the length of the waiting period. The setting of the second timer to a random waiting period at block 502 may be needed to avoid further contention for a shared resource.

At block 504, the method 400 may further include retransmitting the first multicast request packet upon expiration of the random period of time. For example, in an aspect, computing device 300, one or more processors 305 individually or in combination, one or more memories 310 individually or combination, resource access control component 315, and/or transmitting component 320 may be configured to or may comprise means for retransmitting the first multicast request packet upon expiration of the random period of time.

For example, in some aspects, the random wait period may range from about 10 milliseconds to about 50 milliseconds. Referring back to the example shown in FIG. 2, if the first computing device 212*a* receives a multicast request packet from either or both of computing devices 212b and 212c during the first predetermined period of time (first waiting period), the first computing device 212a may retransmit the first multicast request packet upon expiration of the random period of time at block 504.

Figure 6:
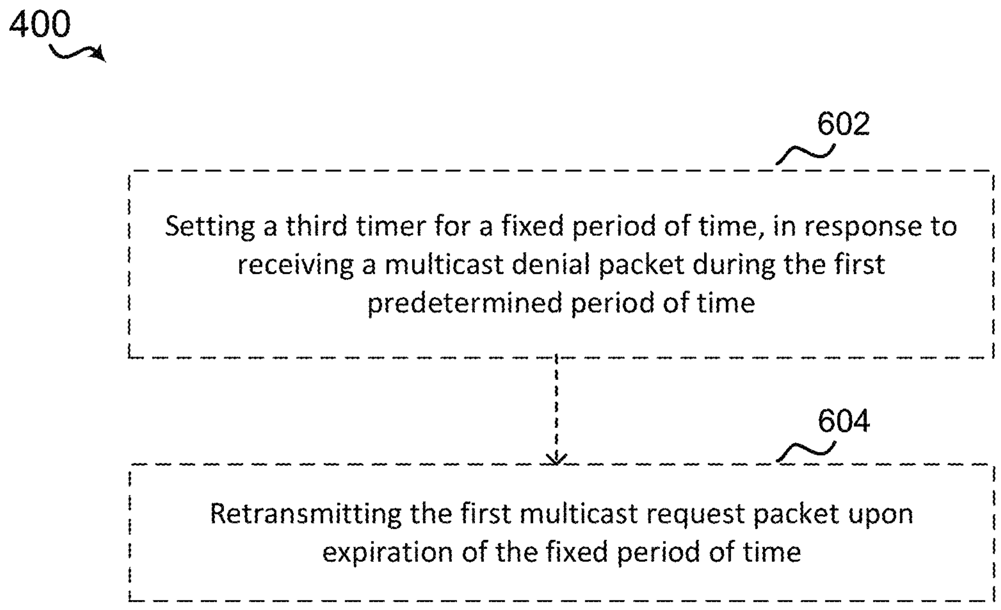
FIG. 6 is a flowchart of additional aspects of the method of FIG. 4 for retransmitting a multicast request packet in response to receiving a multicast denial packet, in accordance with aspects of the present disclosure.

Referring to FIG. 6, in an alternative or additional aspect, at block 602, the method 400 may further include setting a third timer for a fixed period of time, in response to receiving a multicast denial packet during the first predetermined period of time. For example, in an aspect, computing device 300, one or more processors 305 individually or in combination, one or more memories 310 individually or combination, resource access control component 315, and/or setting component 335 may be configured to or may comprise means for setting a third timer for a fixed period of time, in response to receiving a multicast denial packet during the first predetermined period of time.

For example, in an aspect, computing device 300, and/or setting component 335 may be configured to or may comprise means for setting a third timer for a fixed period of time, such as, but not limited to a timer circuit, in response to receiving a multicast denial packet during the first predetermined period of time.

For example, the multicast denial packet may be received during the first period of time if another computing device currently has an access to a shared resource.

At block 604, the method 400 may further include retransmitting the first multicast request packet upon expiration of the fixed period of time. For example, in an aspect, computing device 300, one or more processors 305 individually or in combination, one or more memories 310 individually or combination, resource access control component 315, and/or transmitting component 320 may be configured to or may comprise means for retransmitting the first multicast request packet upon expiration of the fixed period of time.

For example, referring back to the example shown in FIG. 2, if the first computing device 212a receives a multicast denial packet from either of computing devices 212b and 212c during the first predetermined period of time (first waiting period), the first computing device 212a may retransmit the first multicast request packet upon expiration of the fixed period of time at block 604.

Figure 7:
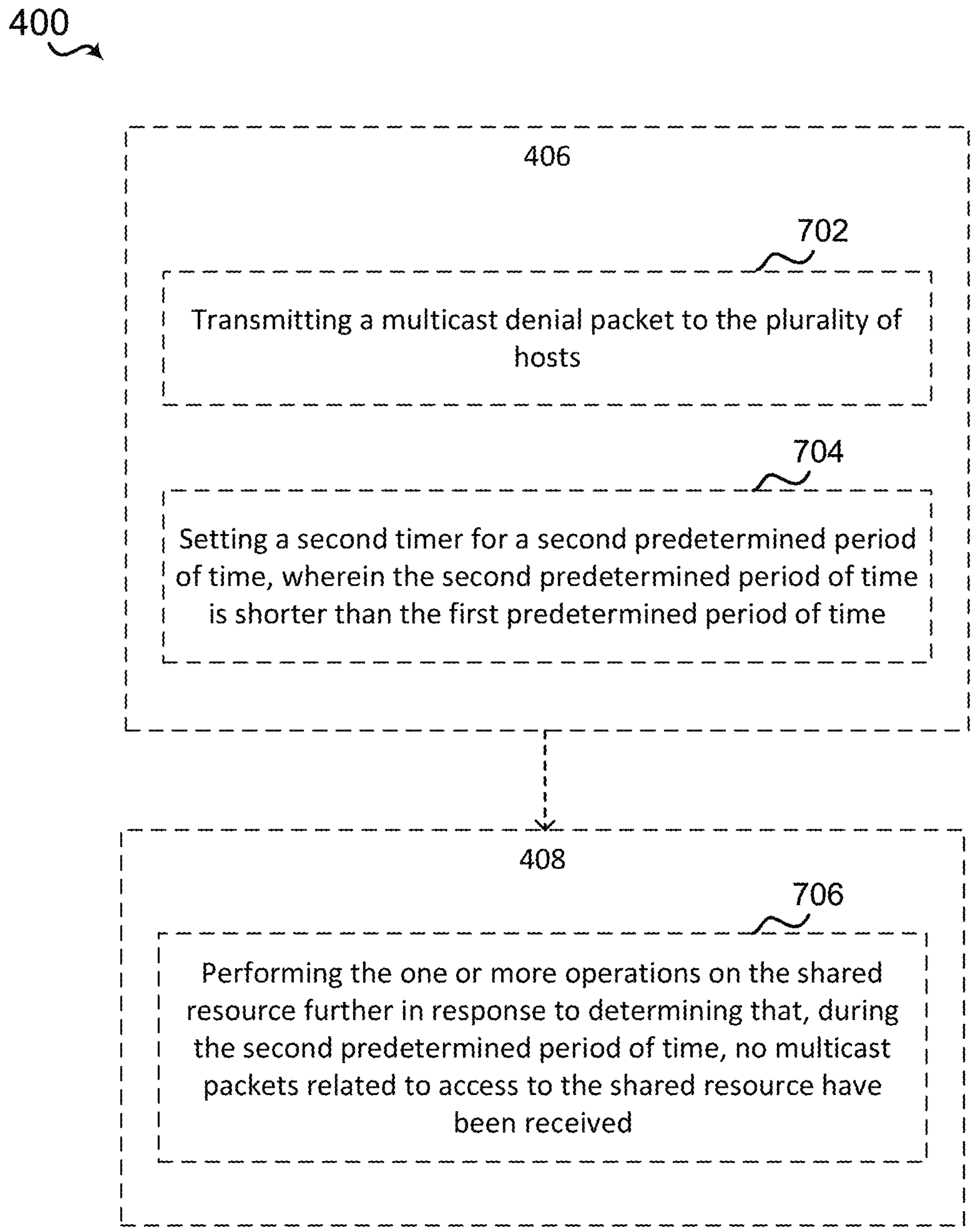
FIG. 7 is a flowchart of additional aspects of the method of FIG. 4 for transmitting a multicast denial packet, in accordance with aspects of the present disclosure.

Referring to FIG. 7, in an alternative or additional aspect, at block 702, the verifying at block 406 that the shared resource is accessible may further include transmitting a multicast denial packet to the plurality of hosts.

For example, in an aspect, the verifying component 330 may send the multicast denial packet to avoid a potential race condition if another computing device is ready to access the shared resource as well.

Additionally, at block 704, the verifying at block 406 that the shared resource is accessible may further include setting a second timer for a second predetermined period of time, wherein the second predetermined period of time is shorter than the first predetermined period of time. For example, the second predetermined period of time may range from about 2 milliseconds to about 10 milliseconds.

Additionally, at block 706, the performing at block 408 of the one or more operations on the shared resource is further in response to determining that, during the second predetermined period of time, no multicast packets related to access to the shared resource have been received.

For example, the performing at block 408 may include synchronizing (updating) a centralized copy of a corresponding password maintained by the password management server 208 in response to determining that, during the second predetermined period of time, no multicast packets related to access to the password maintained by the password management server 208 have been received.

In an alternative or additional aspect, the first multicast request packet, the second multicast request packet, and/or each one of the multicast denial packets may include at least an identifier of the shared resource.

In an alternative or additional aspect, the first multicast request packet, the second multicast request packet, and/or each one of the multicast denial packets may be transmitted using UDP.

In alternative or additional aspect, the one or more performed operations include at least one of updating a value of the shared resource (e.g., corresponding password information), encrypting or decrypting a message associated with the shared resource, or operating a function executed by the shared resource.

Some further aspects are provided in the below clauses.

1. A method for controlling access to a shared resource among hosts on a distributed network, comprising:
   transmitting a first multicast request packet to a plurality of hosts to request access to the shared resource;
   setting a first timer for a first predetermined period of time after transmitting the first multicast request packet;
   verifying that the shared resource is accessible, in response to determining that, during the first predetermined period of time, no multicast packets related to access to the shared resource have been received; and
   performing one or more operations on the shared resource, in response to verifying that the shared resource is accessible.
2. The method of clause 1, wherein the first multicast request packet includes at least an identifier of the shared resource.
3. The method of any one of the above clauses, wherein transmitting the first multicast request packet comprises transmitting the first multicast request packet using user datagram protocol (UDP).
4. The method of any one of the above clauses, further comprising:
   setting a second timer for a random period of time, in response to receiving a second multicast request packet during the first predetermined period of time; and
   retransmitting the first multicast request packet upon expiration of the random period of time.
5. The method of clause 4, wherein the second multicast request packet includes at least an identifier of the shared resource.
6. The method of any one of clauses 4 or 5, wherein the second multicast request packet is transmitted using user datagram protocol (UDP).
7. The method of any one of the above clauses, further comprising:
   setting a third timer for a fixed period of time, in response to receiving a multicast denial packet during the first predetermined period of time; and
   retransmitting the first multicast request packet upon expiration of the fixed period of time.
8. The method of clause 7, wherein the multicast denial packet includes at least an identifier of the shared resource.
9. The method of any one of clauses 7 or 8, wherein the multicast denial packet is transmitted using user datagram protocol (UDP).
10. The method of any one of the above clauses, wherein verifying that the shared resource is accessible further comprises:

transmitting a multicast denial packet to the plurality of hosts, in response to determining that, during the first predetermined period of time, no multicast packets related to access to the shared resource have been received;

setting a second timer for a second predetermined period of time, wherein the second predetermined period of time is shorter than the first predetermined period of time; and wherein performing the one or more operations on the shared resource is further in response to determining that, during the second predetermined period of time, no multicast packets related to access to the shared resource have been received.

11. The method of clause 10, wherein the multicast request packet and the multicast denial packet include at least an identifier of the shared resource.

12. The method of any one of clauses 10 or 11, wherein transmitting the first multicast request packet and the multicast denial packet comprises transmitting the first multicast request packet and the multicast denial packet using user datagram protocol (UDP).

13. The method of any one of the above clauses, wherein the one or more operations include at least one of updating a value of the shared resource, encrypting or decrypting a message associated with the shared resource, or operating a function executed by the shared resource.

14. An apparatus for controlling access to a shared resource on a distributed network, comprising:

one or more memories storing instructions; and one or more processors communicatively coupled with the one or more memories and, individually or in combination, configured to execute the instructions to:

transmit a first multicast request packet to a plurality of hosts to request access to the shared resource;

set a first timer for a first predetermined period of time after transmitting the first multicast request packet;

verify that the shared resource is accessible, in response to determining that, during the first predetermined period of time, no multicast packets related to access to the shared resource have been received; and perform one or more operations on the shared resource, in response to verifying that the shared resource is accessible.

15. The apparatus of clause 14, wherein the one or more processors, individually or in combination, are further configured to execute the instructions to perform the method of any one of clauses 2 to 13.

16. An apparatus for controlling access to a shared resource on a distributed network, comprising means for:

transmitting a first multicast request packet to a plurality of hosts to request access to the shared resource;

setting a first timer for a first predetermined period of time after transmitting the first multicast request packet;

verifying that the shared resource is accessible, in response to determining that, during the first predetermined period of time, no multicast packets related to access to the shared resource have been received; and performing one or more operations on the shared resource, in response to verifying that the shared resource is accessible.

17. The apparatus of clause 16, further comprising means for performing the method of any one of clauses 2 to 13.

18. One or more non-transitory computer-readable media having instructions stored thereon for controlling access to a shared resource on a distributed network, wherein the instructions are executable by one or more processors, individually or in combination, to:

transmit a first multicast request packet to a plurality of hosts to request access to the shared resource;

set a first timer for a first predetermined period of time after transmitting the first multicast request packet;

verify that the shared resource is accessible, in response to determining that, during the first predetermined period of time, no multicast packets related to access to the shared resource have been received; and perform one or more operations on the shared resource, in response to verifying that the shared resource is accessible.

19. The one or more non-transitory computer-readable media of clause 18, wherein the instructions are further executable to perform the method of any one of clauses 2 to 13.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling access to a shared resource on a distributed network, comprising:

transmitting a first multicast request packet to a plurality of hosts to request access to the shared resource;

setting a first timer for a first predetermined period of time after transmitting the first multicast request packet;

verifying that the shared resource is accessible, in response to determining that, during the first predetermined period of time, no multicast packets related to access to the shared resource have been received, wherein verifying that the shared resource is accessible comprises transmitting a multicast denial packet to the plurality of hosts in response to determining that, during the first predetermined period of time, no multicast packets related to access to the shared resource have been received, and setting a second timer for a second predetermined period of time, wherein the second predetermined period of time is shorter than the first predetermined period of time; and performing one or more operations on the shared resource, in response to verifying that the shared resource is accessible and further in response to determining that, during the second predetermined period of time, no multicast packets related to access to the shared resource have been received.

2. The method of claim 1, wherein the first multicast request packet includes at least an identifier of the shared resource.

3. The method of claim 1, wherein transmitting the first multicast request packet comprises transmitting the first multicast request packet using user datagram protocol (UDP).

4. The method of claim 1, further comprising:
setting a second timer for a random period of time, in response to receiving a second multicast request packet during the first predetermined period of time; and
retransmitting the first multicast request packet upon expiration of the random period of time.

5. The method of claim 4, wherein the second multicast request packet includes at least an identifier of the shared resource.

6. The method of claim 4, wherein the second multicast request packet is transmitted using user datagram protocol (UDP).

7. The method of claim 1, further comprising:
setting a third timer for a fixed period of time, in response to receiving a multicast denial packet during the first predetermined period of time; and
retransmitting the first multicast request packet upon expiration of the fixed period of time.

8. The method of claim 7, wherein the multicast denial packet includes at least an identifier of the shared resource.

9. The method of claim 7, wherein the multicast denial packet is transmitted using user datagram protocol (UDP).

10. The method of claim 1, wherein verifying that the shared resource is accessible further comprises: further comprising performing the one or more operations on the shared resource only after both the first timer and the second timer expire without receipt of further multicast packets related to access to the shared resource.

11. The method of claim 1, wherein the multicast denial packet include at least an identifier of the shared resource.

12. The method of claim 1, wherein transmitting the first multicast request packet and the multicast denial packet comprises transmitting the first multicast request packet and the multicast denial packet using user datagram protocol (UDP).

13. The method of claim 1, wherein the one or more operations include at least one of updating a value of the shared resource, encrypting or decrypting a message associated with the shared resource, or operating a function executed by the shared resource.

14. An apparatus for controlling access to a shared resource on a distributed network, comprising:
one or more memories storing instructions; and
one or more processors communicatively coupled with the one or more memories and, individually or in combination, configured to execute the instructions to:
transmit a first multicast request packet to a plurality of hosts to request access to the shared resource;
set a first timer for a first predetermined period of time after transmitting the first multicast request packet;
verify that the shared resource is accessible, in response to determining that, during the first predetermined period of time, no multicast packets related to access to the shared resource have been received, wherein to verify that the shared resource is accessible the one or more processors, individually or in combination, are further configured to execute the instructions to transmit a multicast denial packet to the plurality of hosts in response to determining that, during the first predetermined period of time, no multicast packets related to access to the shared resource have been received, and set a second timer for a second predetermined period of time, wherein the second predetermined period of time is shorter than the first predetermined period of time; and
perform one or more operations on the shared resource, in response to verifying that the shared resource is accessible and further in response to determining that, during the second predetermined period of time, no multicast packets related to access to the shared resource have been received.

15. The apparatus of claim 14, wherein the first multicast request packet includes at least an identifier of the shared resource, wherein to transmit the first multicast request packet, the one or more processors, individually or in combination, are further configured to execute the instructions to transmit the first multicast request packet using user datagram protocol (UDP).

16. The apparatus of claim 14, wherein the one or more processors, individually or in combination, are further configured to execute the instructions to:
set a second timer for a random period of time, in response to receiving a second multicast request packet during the first predetermined period of time; and
retransmit the first multicast request packet upon expiration of the random period of time.

17. The apparatus of claim 16, wherein the second multicast request packet includes at least an identifier of the shared resource, wherein the second multicast request packet is transmitted using user datagram protocol (UDP).

18. The apparatus of claim 14, wherein the one or more processors, individually or in combination, are further configured to execute the instructions to:
set a third timer for a fixed period of time, in response to receiving a multicast denial packet during the first predetermined period of time; and
retransmit the first multicast request packet upon expiration of the fixed period of time.

19. The apparatus of claim 14, wherein to verify that the shared resource is accessible, the one or more processors, individually or in combination, are further configured to execute the instructions to: wherein the one or more processors, individually or in combination, are further configured to execute the instructions to perform the one or more operations on the shared resource only after both the first timer and the second timer expire without receipt of further multicast packets related to access to the shared resource.

20. One or more non-transitory computer-readable media having instructions stored thereon for controlling access to a shared resource on a distributed network, wherein the instructions are executable by one or more processors, individually or in combination, to:
transmit a first multicast request packet to a plurality of hosts to request access to the shared resource;
set a first timer for a first predetermined period of time after transmitting the first multicast request packet;
verify that the shared resource is accessible, in response to determining that, during the first predetermined period of time, no multicast packets related to access to the shared resource have been received, wherein verifying that the shared resource is accessible comprises transmitting a multicast denial packet to the plurality of hosts in response to determining that, during the first predetermined period of time, no multicast packets related to access to the shared resource have been received, and setting a second timer for a second predetermined period of time, wherein the second predetermined period of time is shorter than the first predetermined period of time; and
perform one or more operations on the shared resource, in response to verifying that the shared resource is accessible and further in response to determining that, during the second predetermined period of time, no multicast packets related to access to the shared resource have been received.

* * * * *